Jan. 17, 1956     W. S. BARNHART     2,731,505
PROCESS OF PREPARING BROMOCHLORODIFLUOROMETHANE
BY REACTING CHLORODIFLUORO METHANE AND BROMINE
Filed June 24, 1952     3 Sheets—Sheet 1

INVENTOR.
WILLIAM S. BARNHART
BY
Ely, Frye & Hamilton
ATTYS.

United States Patent Office 2,731,505
Patented Jan. 17, 1956

2,731,505

PROCESS OF PREPARING BROMOCHLORO-DIFLUOROMETHANE BY REACTING CHLORODIFLUOROMETHANE AND BROMINE

William S. Barnhart, Cranford, N. J., assignor to The Firestone Tire & Rubber Company, Akron, Ohio, a corporation of Ohio Application June 24, 1952, Serial No. 295,241

7 Claims. (Cl. 260—653)

This invention relates to the preparation of perhalomethanes by the bromination of chlorodifluoromethane. In the range of 300° or preferably 550° to 650° C. the primary product is chlorobromodifluoromethane, $CBrClF_2$. This is claimed herein as a new compound. At temperatures over 650° and preferably not above 750° C., dibromodifluoromethane, $CBr_2F_2$, is the primary product. Ordinarily temperatures no higher than 900° or 1000° C. will be used because at higher temperatures at atmospheric pressure the yield of high boiling derivatives is excessive. At temperatures between 550° C. and 900° C. there will be obtained a mixture of perhalomethanes containing a substantial amount of each of these two compounds.

At the lower temperature bromination is effected without replacement of any of the different halogens already present. At the higher temperature, chlorine is replaced by bromine, an unusual type of substitution, and perhaps unique.

Chlorobromodifluoromethane is a useful fire-extinguishing liquid and a valuable chemical intermediate. It may be reacted with olefins to produce new adducts. Any mixture of chlorobromodifluoromethane and dibromodifluoromethane obtained by the process of this invention may be used as a fire-fighting liquid.

Figure 1:
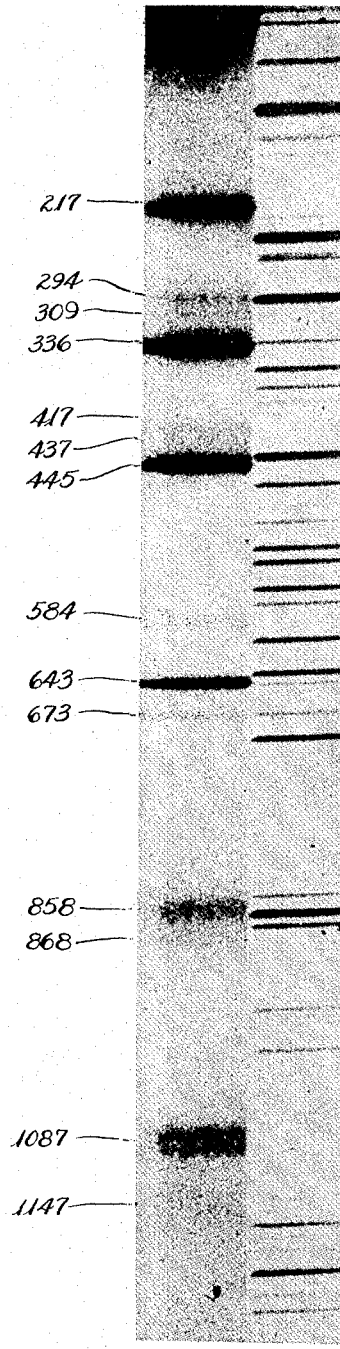
Figure 1 is a Raman spectrogram of liquid chlorobromodifluoromethane.

The Raman spectrum was obtained with the liquid bromochlorodifluoromethane at room temperature using the mercury line 4358A as the exciting line. In Figure 1, the Raman spectrum is at the left, the spectrum at the right being that of the iron arc. The wave lengths of the lines in the Raman spectrum are found by interpolation with the iron arc spectrum. The frequencies of vibrations of the atoms in the molecule are obtained by subtracting the wavelengths of the Raman lines in the photograph (expressed in frequency units) from the wavelength of the exciting line (expressed in frequency units). These are the numbers given opposite the lines in the Raman spectrum.

Figure 2:
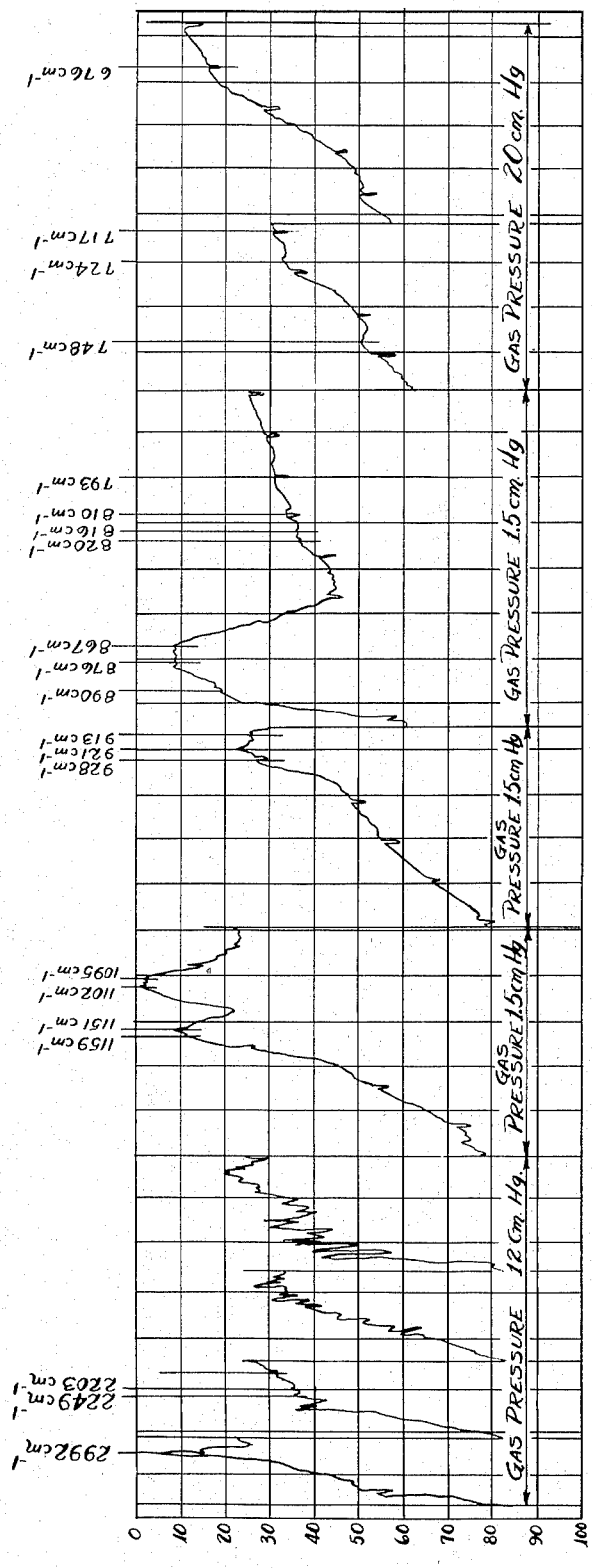
Figure 2 is an energy trace of the infra red spectrum of gaseous chlorobromodifluoromethane.

The infra red spectrum was obtained by using gaseous bromochlorodifluoromethane at the pressures shown on Figure 2. The use of liquid material for the Raman spectrum and gaseous for the infra red spectrum explains the differences found for the frequencies of the same band when it occurs in both the Raman and infra red spectrum. The absorption of light in the infra red spectrum is represented by maxima in the curve. The positions of these maxima are found by interpolations between standardizing marks and these, expressed in frequency units ($cm.^{-1}$), represent the vibrations of the atom in the molecule. Generally, as in the Raman spectrum, strong bands are associated with the fundamental vibrations of the atoms of the molecule.

On account of the symmetry of this molecule it is not to be expected that all of the fundamental frequencies of vibration of the molecule will be observed in both the Raman spectrum and infra red spectrum. Some frequencies, depending upon the molecular symmetry, are only Raman active, some are only infra red active, and some are both Raman and infra red active.

Stepanov (Calculation of Unknown Vibration Spectra of Halogen Substituted Methanes, Compte Rend. Acad. Sci. U. S. S. R., vol. 45, pages 56–7, 1944) predicts the vibration frequencies of chlorobromodifluoromethane and other halogen-substituted methanes which he describes as "molecules not investigated by experiment." His postulated frequencies are 200, 260, 350, 390, 440, 640, 790, 1070, 1130. Figures 1 and 2 show these frequencies and frequencies actually obtained, the compound having a fundamental at 868±5 and no strong vibration at 790.

Figure 3:
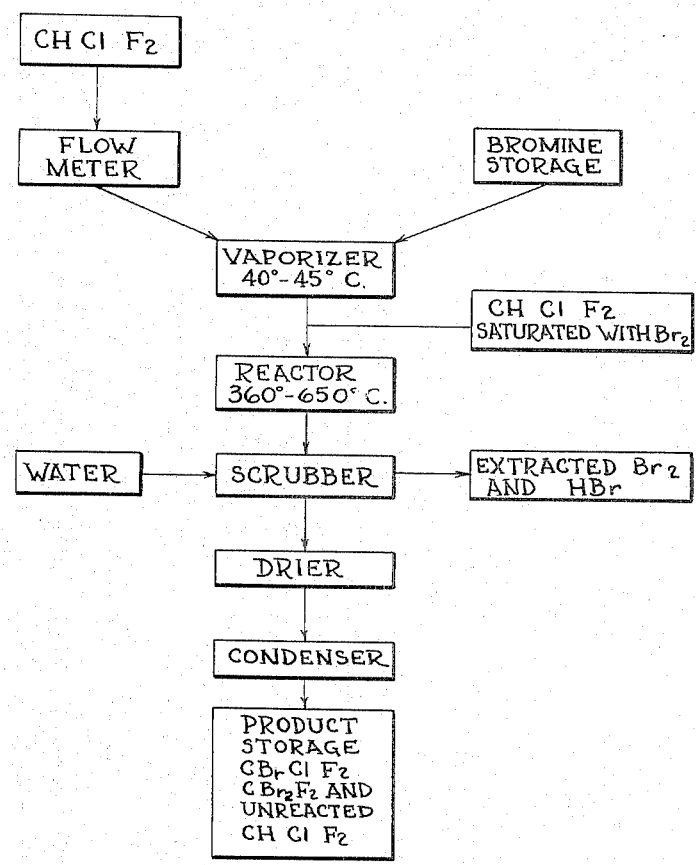
Figure 3 is a flow sheet of the process.

Figure 3 is a flow sheet illustrating the process. Chlorodifluoromethane (Freon 22) is supplied from a cylinder or other pressure equipment. This gaseous material flows through suitable metering equipment into bromine supplied continuously to a vaporizer from a suitable source. The bromine is maintained at a temperature of about 42° C., which is calculated to give bromine gas at a pressure of one-half atmosphere. The chlorodifluoromethane enters the vaporizer at about 25° C. The reactants are preferably used in a mole ratio of 1:1 plus or minus twenty per cent. A suitable head of bromine is maintained in the vaporizer at all times to insure maintenance of equilibrium conditions.

The mixed vapors of bromine and chlorodifluoromethane are passed from the vaporizer directly into a combustion tube or other suitable high temperature equipment. Pyrex, nickel, and Monel tubes have been used successfully in carrying out the reaction in the laboratory. These tubes have been used both with and without packing. The combustion tube and packing must be capable of withstanding the high temperatures used. The temperature may be measured by a thermocouple placed next to the outside center of the tube. The exhaust gases from the tube are introduced into the bottom of a scrubber. The gases may be scrubbed with either water or alkali to remove unreacted bromine and HBr.

The scrubbed gases are dried with calcium chloride or other desiccant in a drying tower or other suitable equipment, and then fed through a series of traps which are preferably cooled to below −20° C. to recover the perhalomethanes which are produced.

Several different runs were conducted using different operating conditions, but following the above general procedure. The gases were scrubbed with water, dried with calcium chloride, and then supercooled with solid carbon dioxide. This condensed the haloorganic compounds while permitting the residual hydrogen bromide to escape. The condensate was fractionated at low temperature to yield products free from hydrogen bromide. The conditions for each run are indicated in the following table which includes the weight of the product and the weight of different fractions.

Thermal bromination of chlorodifluoromethane

| Run | A | B | C | D | E |
|---|---|---|---|---|---|
| Furnace temp., ° C | 650 | 750 | 750 | 775 | 725 |
| Bromine temp., ° C | 43 | 41 | 41 | 41 | 40 |
| Contact time, sec | 1 | 1 | 1 | 0.75 | 1 |
| Elapsed time, hr | 1.33 | 1.33 | 5.67 | 2.0 | 2.33 |
| Product: Weight, parts | 150 | (1) | 368 | 243 | 433 |
| Fractionation Yields: | | | | | |
|   −40 to −5° C., parts | 19 | 6 | 68 | 58 | 75 |
|   −5 to 0° C., parts | 82 | 12 | 84 | 50 | 115 |
|   0 to 20° C., parts | 8 | 8 | 13 | 20 | 21 |
|   20 to 25° C., parts | 10 | 21 | 94 | 58 | 117 |
|   >25° C., parts | 5 | 15 | 74 | 46 | 84 |

[1] (In run B some of the product was lost so that the total weight of the reaction product is not given.) Under preferred operating conditions the combined yield of $CF_2Br_2$ and $CBrClF_2$ is at least fifty percent.

The first fraction, boiling between −40 and −5° C., includes the unreacted starting material, chlorodifluoromethane, boiling at −40° C. The second fraction, boiling between −5° C., and 0° C., is primarily bromochlorodifluoromethane. It has a boiling point of −2.5° C., a freezing point of −140° C., and $d_4^0$ of 1.917. After an intermediate cut the dibromodifluoromethane was recovered in the fraction boiling at 20 to 25° C.

Run A conducted at 650° C. yielded primarily bromochlorodifluoromethane and unreacted starting material. Reaction at the high temperature of 775° C. used in run D caused the formation of a substantial amount of high boiling residue. Substantial yields of both chlorobromodifluoromethane and dibromodifluoromethane were obtained in run E by heating the tube to 725° C. using a contact time of one second, although dibromodifluoromethane was the primary product.

Although atmospheric pressure was used in the experiments, reduced pressure or superatmospheric pressure may be used satisfactorily. A temperature range of 300 to 900° C. at atmospheric pressure will ordinarily be employed. Temperatures in the range of 550 to 650° C. will ordinarily be preferred for the production of a primary yield of bromochlorodifluoromethane. For the production of a primary yield of dibromodifluoromethane higher temperatures in the range of 650–750° C. will be preferred.

The ratio of the chlorodifluoromethane and bromine passing through the combustion tube or other reaction equipment may vary from 25 to 45 parts of the former to 75 to 55 parts of the latter. The combustion equipment may or may not contain packing. The mixture of vapors for the reaction is conveniently obtained by bubbling the chlorodifluoromethane through bromine at a temperature of 40 to 45° C. at atmospheric pressure in order to obtain a gas composed of equimolecular proportions of the two reactants.

Water is a convenient medium for absorption of the generated hydrobromic acid in the wash tower. Alkaline reagents and their aqueous solutions and solutions in organic solvents may be used.

This application is a continuation-in-part of my Application Serial No. 136,277 filed December 31, 1949, now abandoned.

What is claimed is:

1. A process of producing perhalomethanes which comprises reacting equimolecular proportions of bromine and chlorodifluoromethane at a temperature of 300° to 1000° C.

2. A process of producing a mixture of perhalomethanes which includes a substantial amount of bromochlorodifluoromethane and a substantial amount of dibromodifluoromethane which comprises reacting a mixture of 25 to 45 per cent by weight of chlorodifluoromethane and 75 to 55 per cent by weight of bromine at 550 to 750° C.

3. A process of producing bromochlorodifluoromethane which comprises brominating chlorodifluoromethane at 300° to 650° C.

4. A process of producing dibromodifluoromethane which comprises reacting bromine with chlorodifluoromethane at 650° to 900° C.

5. A process of producing bromochlorodifluoromethane which comprises brominating chlorodifluoromethane at 400° to 600° C.

6. A process which comprises brominating chlorodifluoromethane by passing a vapor mixture thereof with bromine through a zone heated to a temperature between about 300° C. and the pyrolysis temperature under the conditions employed.

7. A process of producing bromochlorodifluoromethane which comprises brominating chlorodifluoromethane at a temperature between substantially 300° C and 900° C.

References Cited in the file of this patent

Stepanov: Compte. Rend. Acad. Sci., U. S. S. R., vol. 45, pages 56–7 (1944).